United States Patent
Dai et al.

(10) Patent No.: US 10,230,503 B2
(45) Date of Patent: Mar. 12, 2019

(54) METHODS AND DEVICES FOR DETERMINING OR ACQUIRING RADIO RESOURCES

(71) Applicant: ZTE Corporation, Shenzhen (CN)

(72) Inventors: Bo Dai, Shenzhen (CN); Zhaohua Lu, Shenzhen (CN); Feng Xie, Shenzhen (CN); Wei Gou, Shenzhen (CN); Focai Peng, Shenzhen (CN)

(73) Assignee: XI'AN ZHONGXING NEW SOFTWARE CO., LTD, Xi'An (CN)

( * ) Notice: Subject to any disclaimer, the term of this patent is extended or adjusted under 35 U.S.C. 154(b) by 172 days.

(21) Appl. No.: 15/113,924

(22) PCT Filed: Jul. 28, 2014

(86) PCT No.: PCT/CN2014/083168
§ 371 (c)(1),
(2) Date: Jul. 25, 2016

(87) PCT Pub. No.: WO2015/109805
PCT Pub. Date: Jul. 30, 2015

(65) Prior Publication Data
US 2016/0359593 A1    Dec. 8, 2016

(30) Foreign Application Priority Data

Jan. 23, 2014   (CN) .......................... 2014 1 0033396

(51) Int. Cl.
*H04W 72/00*    (2009.01)
*H04L 5/00*    (2006.01)
(Continued)

(52) U.S. Cl.
CPC ............ *H04L 5/001* (2013.01); *H04L 5/0073* (2013.01); *H04L 27/0006* (2013.01); *H04W 72/0453* (2013.01); *H04W 16/14* (2013.01)

(58) Field of Classification Search
None
See application file for complete search history.

(56) References Cited

U.S. PATENT DOCUMENTS

| | | | | |
|---|---|---|---|---|
| 2011/0116480 A1* | 5/2011 | Li | ........................ | H04W 28/04 370/332 |
| 2011/0312328 A1* | 12/2011 | Choi | .................... | H04L 5/0062 455/450 |

(Continued)

FOREIGN PATENT DOCUMENTS

| CN | 1833408 | 9/2006 |
|---|---|---|
| CN | 102292937 A | 12/2011 |

(Continued)

OTHER PUBLICATIONS

International Search Report for corresponding application PCT/CN2014/083168 filed Jul. 28, 2014; dated Nov. 4, 2014.

(Continued)

*Primary Examiner* — Brandon M Renner
(74) *Attorney, Agent, or Firm* — Cantor Colburn LLP

(57) ABSTRACT

Provided are methods and devices for determining or acquiring radio resources. The method for determining radio resources includes that: predefined information is acquired, wherein the predefined information includes indication information of a dedicated node, and/or, measured values of Component Carriers (CCs) on a multisystem shared spectrum, wherein the indication information includes: information of the maximum number of CCs, which are available to a system, on the multisystem shared spectrum, and the measured values are acquired according to preset signals on the CCs; and the maximum number of CCs, which are available to a system, on the multisystem shared spectrum is determined according to the predefined information. By the technical solution, the problem of interference between (Continued)

systems may be solved, and spectrum utilization efficiency is improved.

24 Claims, 2 Drawing Sheets

(51) Int. Cl.
*H04L 27/00* (2006.01)
*H04W 72/04* (2009.01)
*H04W 16/14* (2009.01)

(56) References Cited

U.S. PATENT DOCUMENTS

| | | | |
|---|---|---|---|
| 2012/0039280 A1* | 2/2012 | Chen | H04L 1/1861 370/329 |
| 2012/0188952 A1* | 7/2012 | Baldemair | H04L 1/1822 370/329 |
| 2012/0282942 A1 | 11/2012 | Uusitalo | |
| 2013/0121316 A1 | 5/2013 | Skov | |
| 2013/0156005 A1 | 6/2013 | Li | |
| 2013/0201884 A1* | 8/2013 | Freda | H04W 72/005 370/278 |
| 2016/0157235 A1* | 6/2016 | Xue | H04W 72/0453 370/329 |
| 2016/0183308 A1* | 6/2016 | Eriksson | H04L 1/1812 370/329 |
| 2016/0337922 A1* | 11/2016 | Mustajarvi | H04W 36/22 |

FOREIGN PATENT DOCUMENTS

| | | |
|---|---|---|
| CN | 102843696 A | 12/2012 |
| CN | 103024911 A | 4/2013 |

OTHER PUBLICATIONS

European Search Report for corresponding application EP14879538; Report dated Nov. 9, 2016.

* cited by examiner

METHODS AND DEVICES FOR DETERMINING OR ACQUIRING RADIO RESOURCES

TECHNICAL FIELD

The present disclosure relates to the field of communication, and in particular to methods and devices for determining or acquiring radio resources.

BACKGROUND

In a wireless cellular communication system, an Evolved Node B (eNB) or Base Station (BS) is equipment providing wireless access for User Equipment (UE) (which may also be called a terminal), and the eNB or BS performs wireless communication with the UE through electromagnetic waves. An eNB or a BS may provide one or more serving cells, and a wireless communication system can provide wireless coverage for terminals in a certain geographical scope through the one or more serving cells.

Spectrum resources may be divided into licensed spectrums, unlicensed spectrums and dedicated spectrums, for example, unlicensed spectrums for Wireless Fidelity (WiFi) systems, dedicated spectrums for radio and television and licensed spectrums purchased by each telecommunication operating company. In order to better utilize spectrum resources, improve spectrum utilization efficiency and increase data transmission throughput, more systems will work on unlicensed spectrums, for example, a Long Term Evolution (LTE) system and a High Speed Packet Access (HSPA) system. Simultaneous work of wireless communication systems of different modes and different operating companies on the unlicensed spectrum may cause the problem of mutual interference, and there is yet no effective solution.

SUMMARY

For the problem of mutual interference caused by simultaneous work of wireless communication systems of different modes and different operating companies on the unlicensed spectrum, the present disclosure provides methods and devices for determining or acquiring radio resources, so as to at least solve the problem.

According to one aspect of the embodiments of the present disclosure, a method for determining radio resources is provided, which may include that: predefined information is acquired, wherein the predefined information may include indication information of a dedicated node, and/or, measured values of Component Carriers (CCs) on a multisystem shared spectrum, wherein the indication information may include: information of the maximum number of CCs, which are available to a system, on the multisystem shared spectrum, and the measured values may be acquired according to preset signals on the CCs; and the maximum number of CCs, which are available to a system, on the multisystem shared spectrum is determined according to the predefined information.

In an exemplary embodiment, when the predefined information includes the measured values of the CCs on the multisystem shared spectrum, the step that the maximum number of CCs, which are available to the system, on the multisystem shared spectrum is determined according to the predefined information may include that: if the number of CCs of which the measured values are smaller than a threshold is H and the number of CCs currently used by the system is smaller than H, the number of the CCs used by the system is selected on a premise that a first predefined principle is met, wherein the first predefined principle may include that: the maximum number of the CCs used by the system is required not to exceed H.

In an exemplary embodiment, when the predefined information includes the measured values of the CCs on the multisystem shared spectrum, if the number of CCs of which the measured values are smaller than a threshold is H and the number of CCs currently used by the system is more than H, the method may further include that: the system releases occupied radio resources.

In an exemplary embodiment, the step that the system releases the occupied radio resources may include that: the system releases a part of the occupied radio resources at one time to make the number of aggregated CCs after the release less than or equal to H, or, to make the number of released CCs at least more than or equal to 1.

In an exemplary embodiment, if H is 0 or H is less than or equal to a predefined value N, the maximum number of the CCs used by the system may be N or k, wherein N and k may be positive integers and k may be smaller than N.

In an exemplary embodiment, N may be 1 or 2 or 3.

In an exemplary embodiment, when the predefined information includes the measured values of the CCs on the multisystem shared spectrum, the step that the predefined information is acquired may include that: the system measures, when preset time is reached, the preset signals of various CCs on the multisystem shared spectrum to acquire the measured values of the CCs on the multisystem shared spectrum.

In an exemplary embodiment, the preset time may include one of: time selected within a preset time period by the system; time when a preset measurement period is reached; and time when system performance reaches a preset value.

In an exemplary embodiment, when the predefined information includes the measured values of the CCs on the multisystem shared spectrum, the step that the predefined information is acquired may include one of that: the measured values of the corresponding CCs are determined according to interference signal strength measured on each CC; the measured values of the corresponding CCs are determined according to known signal strength measured on each CC; and the measured values of the corresponding CCs are determined according to a ratio of known signal strength to interference signal strength measured on each CC.

In an exemplary embodiment, when the predefined information includes the measured values of the CCs on the multisystem shared spectrum, after the step that the maximum number of CCs, which are available to the system, on the multisystem shared spectrum is determined according to the predefined information, the method may further include that: the CCs used by the system are determined according to the measured values of various CCs.

In an exemplary embodiment, the step that the CCs used by the system are determined according to the measured values of various CCs may include that: Carrier Aggregation (CA) is performed according to a sequence of small to large measured values, and if the system is able to use a resource of only one CC, the CC with the smallest measured value is selected, or, any CC is selected, or, the CC with the largest measured value is selected.

In an exemplary embodiment, after the step that the maximum number of CCs, which are available to the system, on the multisystem shared spectrum is determined according to the predefined information, the method may further include that: the system acquires resources in a competition manner from CCs, the number of which is not larger than the maximum number of CCs on the multisystem shared spectrum.

In an exemplary embodiment, after the step that the system acquires the resources in the competition manner from the CCs, the number of which is not larger than the maximum number of the CCs on the multisystem shared spectrum, the method may further include that: the system allocates the resources acquired in the competition manner to UE in a scheduling manner.

In an exemplary embodiment, the method may further include that: the UE acquires resources on the multisystem shared spectrum according to system scheduling information, or, the UE acquires resources on the multisystem shared spectrum in a competition manner.

In an exemplary embodiment, the step that the system acquires the resources in the competition manner from the CCs, the number of which is not larger than the maximum number of the CCs on the multisystem shared spectrum may include one of that: the system competes for the resources on each CC according to competition signals or channels on each CC, wherein the number of the CCs acquired by the system in the competition manner is not larger than the maximum number of the CCs; if the CCs corresponding to the multisystem shared spectrum are divided into at least two types, one type being carriers configured to transmit the competition signals or channels and the other type being CCs for data transmission acquired in the competition manner, the system acquires the competition signals or channels from the carriers configured to transmit the competition signals or channels, and then competes for resources on the CCs for data transmission through the acquired competition signals or channels, wherein the sum of the number of the acquired CCs configured to transmit the competition signals or channels and the number of the CCs for data transmission is not larger than the maximum number of the CCs; and if the CCs corresponding to the multisystem shared spectrum are divided into at least two types, one type being CCs acquired in the competition manner and the other type being CCs acquired in a non-competition manner, the system determines corresponding CC acquisition manners according to types of the CCs, wherein the sum of the number of the CCs acquired by the system in the competition manner and the number of the CCs acquired in the non-competition manner is not larger than the maximum number of the CCs.

In an exemplary embodiment, after the step that the system acquires the resources in the competition manner from the CCs, the number of which is not larger than the maximum number of the CCs on the multisystem shared spectrum, the method may further include that: the system determines a using manner for the resources according to the acquired resources.

In an exemplary embodiment, the step that the system determines the using manner for the resources according to the acquired resources may include that: if the resources acquired in the competition manner are discontinuous time-domain resources, the using manner for the resources is determined to include at least one of: an eNB or a BS virtualizes the discontinuous physical resources into continuous resources, and uses the resources according to a working manner adopted by the system for continuous resources; the eNB or BS uses the resources in a time division duplex manner, and configures resources which the system fails to acquire through the competition manner into uplink subframes; the eNB or BS uses the resources according to the working manner adopted by the system for continuous resources, and defines the resources which the system fails to acquire through the competition manner into zero-power subframes or blank subframes; and the eNB or BS broadcasts time-domain position information of the discontinuous time-domain resources.

In an exemplary embodiment, the method may further include that: timing of a Hybrid Automatic Repeat Request (HARQ) of a physical shared channel is redefined according to the resources acquired in the competition manner so that there are resources available for the eNB or BS or a terminal during data sending, or, an adaptive manner or suspending waiting manner is adopted for processing according to known timing.

In an exemplary embodiment, the method may further include that: a bandwidth of the system and a frequency point of the system are set, wherein frequency points of different systems on the same spectrum are aligned.

In an exemplary embodiment, the step that the bandwidth of the system and the frequency point of the system are set may include that: a bandwidth of the system corresponding to the CCs is set on the premise of ensuring the number of the CCs used by the system; or, the bandwidth of the system corresponding to the CCs is set before the number of the CCs used by the system is determined.

In an exemplary embodiment, the step that the bandwidth of the system is set may include that: the bandwidth of the system is set to be a preset value, wherein the preset value may include: 20 MHz, 10 MHz or 5 MHz; or, the preset value is determined according to an available spectrum size of a frequency band on which the system works; or, the bandwidth of the system is set in a manner that the available spectrum size is able to define the number of CCs as many as possible.

According to another aspect of the embodiments of the present disclosure, a device for determining radio resources is provided, which may include: an acquisition component, configured to acquire predefined information, wherein the predefined information may include indication information of a dedicated node, and/or, measured values of CCs on a multisystem shared spectrum, wherein the indication information may include: information of the maximum number of CCs, which are available to a system, on the multisystem shared spectrum, and the measured values may be acquired according to preset signals on the CCs; and a first determination component, configured to determine, according to the predefined information, the maximum number of CCs, which are available to the system, on the multisystem shared spectrum.

In an exemplary embodiment, the device may further include: a releasing component, configured to, when the predefined information includes the measured values of the CCs on the multisystem shared spectrum, if the number of CCs of which the measured values are smaller than a threshold is H and the number of CCs currently used by the system is more than H, release occupied radio resources.

In an exemplary embodiment, the device may further include: a second determination component, configured to, when the predefined information includes the measured values of the CCs on the multisystem shared spectrum, determine the CCs used by the system according to the measured values of various CCs.

In an exemplary embodiment, the device may further include: a competition component, configured to acquire resources in a competition manner from CCs, the number of which is not larger than the maximum number of CCs on the multisystem shared spectrum.

According to another aspect of the embodiments of the present disclosure, a method for acquiring radio resources is provided, which may include that: a system acquires resources from CCs on a multisystem shared spectrum in a competition manner.

In an exemplary embodiment, after the step that the system acquires the resources from the component resources on the multisystem shared spectrum in the competition manner, the method may further include that: the system allocates the resources acquired in the competition manner to UE in a scheduling manner.

In an exemplary embodiment, the method may further include that: the UE acquires resources on the multisystem shared spectrum according to system scheduling information, or, the UE acquires resources on the multisystem shared spectrum in a competition manner.

In an exemplary embodiment, the step that the system acquires the resources from the CCs on the multisystem shared spectrum in the competition manner may include one of that: the system competes for the resources on each CC according to competition signals or channels on each CC; if the CCs corresponding to the multisystem shared spectrum are divided into at least two types, one type being carriers configured to transmit the competition signals or channels and the other type being CCs for data transmission acquired in the competition manner, the system acquires the competition signals or channels from the carriers configured to transmit the competition signals or channels, and then competes for resources on the CCs for data transmission through the acquired competition signals or channels; and if the CCs corresponding to the multisystem shared spectrum are divided into at least two types, one type being CCs acquired in the competition manner and the other type being CCs acquired in a non-competition manner, the system determines corresponding CC acquisition manners according to types of the CCs.

In an exemplary embodiment, the resources acquired in the competition manner may include: resources for sending the competition signals or channels.

In an exemplary embodiment, the resources acquired in the competition manner may further include: resources configured for competition conflict resolving or resources configured for competition resource confirmation.

In an exemplary embodiment, the step that the system acquires the resources from the CCs on the multisystem shared spectrum in the competition manner may include that: the system sends signals monitored on the resources for sending the competition signals or channels by the system on competition confirmation resources corresponding to the selected resources for sending the competition signals or channels; and the system confirms whether the system has acquired the corresponding resources in the competition manner or not through signals, which are monitored and sent by other systems, received on the competition confirmation resources.

In an exemplary embodiment, after the step that the system acquires the resources from the CCs on the multisystem shared spectrum in the competition manner, the method may further include that: the system determines a using manner for the resources according to the acquired resources.

In an exemplary embodiment, the step that the system determines the using manner for the resources according to the acquired resources may include that: if the resources acquired in the competition manner are discontinuous time-domain resources, the using manner for the resources is determined to include at least one of: an eNB or a BS broadcasts time-domain position information of the discontinuous time-domain resources; the eNB or BS virtualizes the discontinuous physical resources into continuous resources, and uses the resources according to a working manner adopted by the system for continuous resources; the eNB or BS uses the resources in a time division duplex manner, and configures resources which the system fails to acquire through the competition manner into uplink subframes; and the eNB or BS uses the resources according to the working manner adopted by the system for continuous resources, and defines the resources which the system fails to acquire through the competition manner into zero-power subframes or blank subframes.

In an exemplary embodiment, the method may further include that: timing of an HARQ of a physical shared channel is redefined according to the resources acquired in the competition manner so that there are resources available for the eNB or BS or a terminal during data sending, or an adaptive manner or suspending waiting manner is adopted for processing according to known timing.

According to another aspect of the embodiments of the present disclosure, a device for acquiring radio resources is provided, which may include: an acquisition component, configured to acquire resources from CCs on a multisystem shared spectrum in a competition manner.

In an exemplary embodiment, the device may further include: an allocation component, configured to allocate the resources acquired in the competition manner to UE in a scheduling manner.

In an exemplary embodiment, the device may further include: a determination component, configured to determine a using manner for the resources according to the resources acquired by the acquisition component.

According to the embodiments of the present disclosure, the number of the carriers used by the system is controlled, so that the problem of intersystem interference is solved, and spectrum utilization efficiency is improved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

In order to meet a requirement of the International Telecommunication Union-Advanced (ITU-Advanced), a Long Term Evolution Advanced (LTE-A) system, as an LTE standard, requires a greater bandwidth of the system (which may maximally reach 100 MHz), and also requires backward compatibility with an existing LTE standard. Based on existing LTE systems, a greater bandwidth may be obtained by combining bandwidths of the LTE systems, and such a technology is called a CA technology. By the technology, a spectrum utilization rate of an IMT-Advanced system may be increased, spectrum resource shortage may be alleviated, and utilization of spectrum resources may be optimized. The LTE system bandwidths subjected to CA may be considered as CCs, and each CC may be called a serving cell, that is, a spectrum may be formed by aggregating n CCs (or serving cells). Resources of R10 UE consist of n CCs (or serving cells) on the frequency domain, wherein one serving cell is called a primary cell or a primary CC, and the other serving cells are called secondary cells or secondary CCs.

The abovementioned CCs may also be considered as sub-channels, each CC corresponds to a sub-channel, or, each CC is considered as a resource unit.

In a related art, for a licensed spectrum, the bandwidth of the system is independently planned by each operating company, and is determined by terminals by detecting signaling or signals, a maximum aggregated carrier number and a size of the licensed spectrum are predefined, and may not be dynamically changed and limited, resources on the licensed spectrum are all available resources, an eNB or a BS allocates CCs to the corresponding terminals according to a scheduling algorithm, and the eNB or BS may regulate transmitted power according to a requirement.

A certain spectrum may include multiple systems, including systems of different modes such as an LTE system and a WiFi system, an LTE system and an HSPA system, an LTE system and a Global System for Mobile Communications (GSM) system, and an LTE system and a Code Division Multiple Access (CDMA) system, and may also include systems of the same mode and different operating companies, such as an LTE system of operating company 1 and an LTE system of operating company 2. Then, there exists the problem of interference between LTE systems of different operating companies and the problem of interference between different systems such as an LTE system and a WiFi system.

For the problem, an embodiment of the present disclosure provides a method for determining radio resources.

Figure 1:
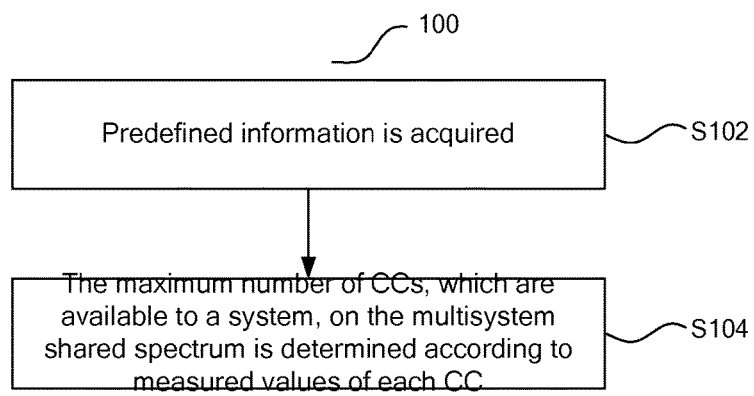
FIG. 1 is a flowchart of a method 100 for determining radio resources according to an embodiment of the present disclosure.

FIG. 1 is a flowchart of a method 100 for determining radio resources according to an embodiment of the present disclosure. As shown in FIG. 1, the method 100 for determining radio resources mainly includes Step S102 and Step S104. In Step S102, predefined information is acquired, wherein the predefined information includes indication information of a dedicated node, and/or, measured values of CCs on a multisystem shared spectrum, wherein the indication information includes: information of the maximum number of CCs, which are available to a system, on the multisystem shared spectrum, and the measured values are acquired according to preset signals on the CCs. Then, in Step S104, the maximum number of CCs, which are available to the system, on the multisystem shared spectrum is determined according to the predefined information.

The dedicated node may be a node belonging to one system or shared by multiple systems in multiple systems of the shared spectrum, and may also be a special node dedicated to the shared spectrum.

According to the method 100 for determining radio resources of the embodiment of the present disclosure, the number of carriers used by the system is controlled, so that the problem of intersystem interference is solved, and spectrum utilization efficiency may also be improved.

Optionally, when the predefined information includes the measured values of the CCs on the multisystem shared spectrum, if the number of CCs of which the measured values obtained in Step S102 are smaller than a threshold is H and the number of CCs currently used by the system is smaller than H, the number of the CCs used by the system may be selected on a premise that a first predefined principle is met in Step S104, wherein the first predefined principle includes that: the maximum number of the CCs used by the system is required not to exceed H.

Optionally, if the number of the CCs of which the measured values obtained in Step S102 are smaller than the threshold is H and the number of CCs currently used by the system is more than H, the method further includes that: the system releases occupied radio resources.

Optionally, in the embodiment of the present disclosure, the step that the system releases the occupied radio resources may include that: the occupied radio resources are released at one time to make the number of aggregated CCs after the release less than or equal to H; or, to make the number of released CCs at least more than or equal to 1, wherein the number of aggregated carriers which are released may be more than H, and may also be less than or equal to H.

Optionally, if H is 0 or H is less than or equal to a predefined value N, the maximum number, determined in Step S104, of the CCs used by the system is N or k, N and k are positive integers and k is smaller than N.

Optionally, in the embodiment of the present disclosure, a value of N is 1 or 2 or 3.

Optionally, in the embodiment of the present disclosure, the system may execute measurement in Step S102 once within a certain time.

Optionally, when the predefined information includes the measured values of the CCs on the multisystem shared spectrum, the measured values may be acquired by measuring the preset signals of each CC in Step S102, wherein measurement time may be independently selected by the system within a certain range, or, the preset signals may be measured according to a certain period, or, a triggered measurement manner may be adopted according to system performance.

In the embodiment of the present disclosure, when the predefined information includes the measured values of the CCs on the multisystem shared spectrum, the measured values may be determined according to measured interference signal strength, or, may be determined according to measured known signal strength, or, the measured values are determined according to a ratio of the measured known signal strength to interference signal strength.

Optionally, in Step S102, measurement is performed by taking one CC as a unit, that is, each CC corresponds to one measured value.

Optionally, when the predefined information includes the measured values of the CCs on the multisystem shared spectrum, after Step S102 is executed, the method may further include that: the CCs used by the system are determined according to the measured values of various CCs.

Optionally, the step that the CCs used by the system are determined according to the measured values of various CCs may include that: CA is performed according to a sequence of small to large measured values, and if the system is able to use a resource of only one CC, the CC with the smallest measured value may be selected, or, any CC is selected, or, the CC with the largest measured value is selected.

Optionally, when magnitudes of the measured values represent interference degrees, if a measured value of a certain CC indicates that the CC is under a strong interference condition, a newly started system or a started system is required to withdraw and reduce the number of used CCs, for example: only use one CC, thereby reducing own interference and reducing interference to other systems; and when there exists an interference system, the maximum number of CCs used by all the systems is limited, for example: only one or two CCs may be used at this moment, and when there is no interference system or few interference systems (relative to the number of available CCs), the maximum number of CCs aggregated by all the systems is unlimited or slightly limited.

By the method, resources in an idle scenario may be maximally utilized, and interference produced by each system in an interference scenario is limited (only one carrier), so that interference control is implemented.

By the method provided by the embodiment of the present disclosure, interference between the systems on the unlicensed spectrum may be reduced, the problem that a certain system always occupies and does not release resources may be solved at the same time, both a system started earlier and a system started later have the same right, and resource utilization fairness is ensured.

Optionally, after the maximum number of CCs which are available to the system is determined, resources used by the system may further be acquired in a competition manner.

Optionally, after different systems acquire the resources in the competition manner, the systems allocate the resources acquired in the competition manner to UE for data receiving or data sending in a scheduling manner; and moreover, different eNBs or BSs and UE may also be considered as ordinary nodes, and then the resources acquired on the spectrum in a Device-to-Device (D2D) competition manner.

Optionally, the system may acquire the resources in the competition manner in one of the following manners that:

Manner a: resources on each CC are acquired in the competition manner according to competition signals or channels on each CC;

Manner b: the CCs are divided into at least two types, one type being carriers configured to transmit the competition signals or channels and the other type being CCs for data transmission acquired in the competition manner, and the system acquires the competition signals or channels from the carriers configured to transmit the competition signals or channels, and then competes for resources on the CCs for data transmission through the acquired competition signals or channels, wherein the sum of the number of the acquired CCs configured to transmit the competition signals or channels and the number of the CCs for data transmission is not larger than the maximum number of the CCs; and Manner c: the CCs corresponding to the multisystem shared spectrum are divided into at least two types, one type being CCs acquired in the competition manner and the other type being CCs acquired in a non-competition manner, and the system determines corresponding CC acquisition manners according to types of the CCs, wherein the sum of the number of the CCs acquired by the system in the competition manner and the number of the CCs acquired in the non-competition manner is not larger than the maximum number of the CCs.

Adopting manner a may implement independent management over each CC, adopting manner b may centralize resources occupied by the competition signals or channels and improve resource utilization efficiency, and adopting manner c may implement combination of the competition manner and the scheduling manner to achieve advantages of the two and improve resource efficiency.

Optionally, after the system acquires the resources in the competition manner, a using manner for the resources may be determined.

Optionally, when the resources acquired in the competition manner are discontinuous time-domain resources, the using manner for the corresponding resources may include at least one of: an eNB or a BS broadcasts time-domain position information of the discontinuous time-domain resources; the eNB or BS virtualizes the discontinuous physical resources into continuous resources, and uses the resources according to a working manner adopted by the system for continuous resources; the eNB or BS uses the resources in a time division duplex manner, and configures resources which the system fails to acquire through the competition manner into uplink subframes; and the eNB or BS uses the resources according to the working manner adopted by the system for continuous resources, and defines the resources which the system fails to acquire through the competition manner into zero-power (muting) subframes or blank subframes.

Optionally, in the embodiment of the present disclosure, timing of an HARQ of a physical shared channel may be redefined according to the resources acquired in the competition manner so that there are resources available for the eNB or BS or a terminal during data sending, or an adaptive manner or a suspending waiting manner may also be adopted for processing according to known timing, that is: when a resource is unavailable, the eNB or BS or the terminal waits for the next available resource for sending, and a corresponding receiving party also does not receive any data when a current resource is unavailable, and waits for the next available resource for receiving.

In the competition manner, systems with strong interference may be prevented from simultaneously using the same spectrum resource.

Optionally, in the embodiment of the present disclosure, a bandwidth of the system may also be managed, specifically including that: the bandwidth of the system and a frequency point of the system are predefined, and in the embodiment of the present disclosure, the bandwidth of the system and the frequency point of the system may not be freely changed after being defined.

In order to reduce interference between systems of different operating companies, it is necessary to coordinate the systems of different operating companies to ensure that frequency points of the systems on the same spectrum are aligned to facilitate frequency-domain interference coordination.

In the embodiment of the present disclosure, the number of the CCs may be preferably ensured, and then the bandwidth of the system corresponding to the CCs is considered, or, the bandwidth of the system corresponding to the CCs may be preferably considered, and then the number of the CCs is considered.

In the embodiment, the step that the bandwidth of the system is predefined may include one of the following manners that: (1) the bandwidth of the system is a predefined value, and may be 20 MHz, 10 MHz and 5 MHz, that is: all the systems are defined according to 20 MHz in a unified manner, or, 20 MHz is taken as a basic resource unit, and each basic resource unit is subjected to predefinition division, and for example, is divided into two 10 MHz, or 5 MHz; (2) the predefined value is determined according to an available spectrum size of a frequency band on which the system works, for example: a 2G spectrum adopts a predefinition of 5 MHz and a 3G spectrum adopts 20 MHz; or, an available spectrum which is 7 MHz is predefined according to 5 MHz, an available spectrum which is 12 MHz is predefined according to 10 MHz, and an available spectrum which is 35 MHz is predefined according to 20 MHz+10 MHz, wherein 5 MHz is a reserved guard band; and (3) in order to obtain more CCs to facilitate interference control, CCs may be defined as many as possible according to the available spectrum size, wherein a minimum bandwidth of the system is 5 MHz, for example: 20 MHz is defined into 4 5 MHz CCs, 40 MHz is defined into 4 10 MHz CCs and 100 MHz is defined into 5 20 MHz CCs.

According to the embodiment of the present disclosure, a device for determining radio resources is further provided, which is configured to implement the abovementioned method 100 for determining radio resources.

Figure 2:
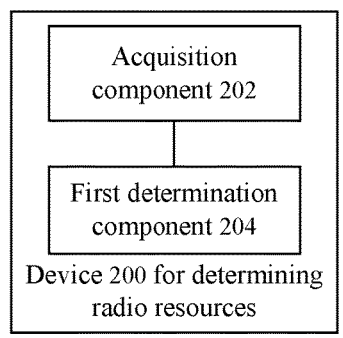
FIG. 2 is a structure diagram of a device 200 for determining radio resources according to an embodiment of the present disclosure.

FIG. 2 is a structure diagram of a device 200 for determining radio resources according to an embodiment of the present disclosure. As shown in FIG. 2, the device for determining radio resources of the embodiment of the present disclosure mainly includes: an acquisition component 202 and a first determination component 204. It should be understood that a connecting relationship of each component shown in FIG. 2 is only an example, and those skilled in the art may totally adopt another connecting relationship as long as each component in such a connecting relationship may implement a function of the present disclosure.

In the specification, functions of each component may be realized by virtue of special software or hardware which may be combined with proper software to execute processing. The hardware or the special hardware may include an Application Specific Integrated Circuit (ASIC), various other circuits, various processors and the like. When the functions are realized by a processor, the functions may be provided by a single special processor, a single shared processor, or multiple independent processors (some therein may be shared). In addition, the processor may not be understood as only hardware which may execute software, but may implicitly include, but not limited to, Digital Signal Processor (DSP) hardware, a Read-Only Memory (ROM) configured to store software, a Random Access Memory (RAM) and nonvolatile storage equipment.

In FIG. 2, the acquisition component 202 is configured to acquire predefined information, wherein the predefined information includes indication information of a dedicated node, and/or, measured values of CCs on a multisystem shared spectrum, wherein the indication information includes: information of the maximum number of CCs, which are available to a system, on the multisystem shared spectrum, and the measured values are acquired according to preset signals on the CCs; and the first determination component 204 is configured to determine, according to the predefined information, the maximum number of CCs, which are available to the system, on the multisystem shared spectrum.

Optionally, when the predefined information includes the measured values of the CCs on the multisystem shared spectrum, if the number of CCs of which the measured values acquired by the acquisition component 202 are smaller than a threshold is H and the number of CCs currently used by the system is smaller than H, the first determination component 204 is configured to select the number of the CCs used by the system on a premise that a first predefined principle is met, wherein the first predefined principle specifically includes that: the maximum number of the CCs used by the system is required not to exceed H.

Figure 3:
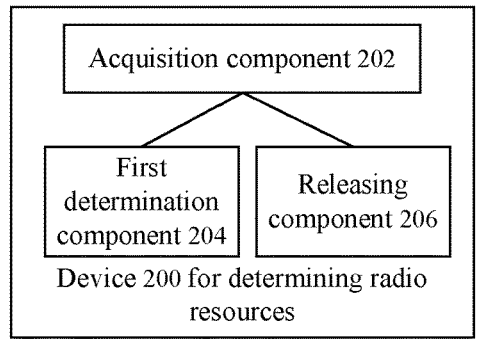
FIG. 3 is an optional structure diagram of a device 200 for determining radio resources according to an embodiment of the present disclosure.

Optionally, as shown in FIG. 3, the device 200 may further include: a releasing component 206, configured to, if the number of CCs of which the measured values are smaller than a threshold is H and the number of CCs currently used by the system is more than H, release occupied radio resources.

Optionally, the releasing component 206 is configured to release a part of the occupied radio resources at one time to make the number of aggregated CCs after the release less than or equal to H, or, to make the number of released CCs at least more than or equal to 1.

Optionally, if H is 0 or H is less than or equal to a predefined value N, the maximum number of the CCs used by the system is N or k, wherein N and k are positive integers and k is smaller than N.

Optionally, N is 1 or 2 or 3.

Optionally, when the predefined information includes the measured values of the CCs on the multisystem shared spectrum, the acquisition component 202 is configured to, when preset time is reached, measure preset signals of various CCs on the multisystem shared spectrum to acquire the measured values of the CCs on the multisystem shared spectrum.

Optionally, the preset time includes one of: time selected within a preset time period by the system; time when a preset measurement period is reached; and time when system performance reaches a preset value.

Optionally, the acquisition component 202 may acquire the measured values of the CCs on the multisystem shared spectrum in one of the following manners that:

the measured values of the corresponding CCs are determined according to interference signal strength measured on each CC;

the measured values of the corresponding CCs are determined according to known signal strength measured on each CC; and the measured values of the corresponding CCs are determined according to a ratio of known signal strength to interference signal strength measured on each CC.

Optionally, the device further includes: a second determination component, configured to, when the predefined information includes the measured values of the CCs on the multisystem shared spectrum, determine the CCs used by the system according to the measured values of various CCs.

Optionally, the second determination component is configured to perform CA according to a sequence of small to large measured values, and if the system is able to use a resource of only one CC, select the CC with the smallest measured value, or, select any CC, or, select the CC with the largest measured value.

Optionally, the device further includes: a competition component, configured to acquire resources in a competition manner from CCs, the number of which is not larger than the maximum number of CCs on the multisystem shared spectrum.

Optionally, the device further includes: a scheduling component, configured to allocate the resources acquired in the competition manner to UE in a scheduling manner.

Optionally, the competition component may acquire the resources in one of the following manners that:

resources on each CC are acquired in the competition manner according to competition signals or channels on each CC, wherein the number of the CCs acquired in the competition manner is not larger than the maximum number of the CCs;

if the CCs corresponding to the multisystem shared spectrum are divided into at least two types, one type being carriers configured to transmit the competition signals or channels and the other type being CCs for data transmission acquired in the competition manner, the competition signals or channels are acquired from the carriers configured to transmit the competition signals or channels, and then resources on the CCs for data transmission are acquired in the competition manner through the acquired competition signals or channels, wherein the sum of the number of the acquired CCs configured to transmit the competition signals or channels and the number of the CCs for data transmission is not larger than the maximum number of the CCs; and if the CCs corresponding to the multisystem shared spectrum are divided into at least two types, one type being CCs acquired in the competition manner and the other type being CCs acquired in a non-competition manner, corresponding CC acquisition manners are determined according to types of the CCs, wherein the sum of the number of the CCs acquired by the system in the competition manner and the number of the CCs acquired in the non-competition manner is not larger than the maximum number of the CCs.

Optionally, the device may further include: a third determination component, configured to determine a using manner for the resources according to the acquired resources.

If the resources acquired in the competition manner are discontinuous time-domain resources, the using manner, determined by the third determination component, for the corresponding resources includes at least one of:

an eNB or a BS virtualizes the discontinuous physical resources into continuous resources, and uses the resources according to a working manner adopted by the system for continuous resources;

the eNB or BS uses the resources in a time division duplex manner, and configures resources which the system fails to acquire through the competition manner into uplink subframes;

the eNB or BS uses the resources according to the working manner adopted by the system for continuous resources, and defines the resources which the system fails to acquire through the competition manner into zero-power subframes or blank subframes; and the eNB or BS broadcasts time-domain position information of the discontinuous time-domain resources.

Optionally, the device further includes: an HARQ timing processing component, configured to redefine timing of an HARQ of a physical shared channel according to the resources acquired in the competition manner so that there are resources available for the eNB or BS or a terminal during data sending, or adopt or an adaptive manner or a suspending waiting manner for processing according to known timing.

Optionally, the device further includes: a setting component, configured to set a bandwidth of the system and a frequency point of the system, wherein frequency points of different systems on the same spectrum are aligned.

Optionally, the setting component is configured to set a bandwidth of the system corresponding to the CCs on the premise of ensuring the number of the CCs used by the system; or, set the bandwidth of the system corresponding to the CCs before the number of the CCs used by the system is determined.

Optionally, the setting component is configured to set the bandwidth of the system to be a preset value, wherein the preset value includes: 20 MHz, 10 MHz or 5 MHz; or, determine the preset value according to an available spectrum size of a frequency band on which the system works; or, set the bandwidth of the system in a manner that the available spectrum size is able to define the number of CCs as many as possible.

The device for determining radio resources of the embodiment of the present disclosure has implementation modes corresponding to all optional implementation modes in the abovementioned method for determining radio resources, which will not be specifically elaborated.

According to the embodiment of the present disclosure, a method 400 for acquiring radio resources is further provided.

Figure 4:
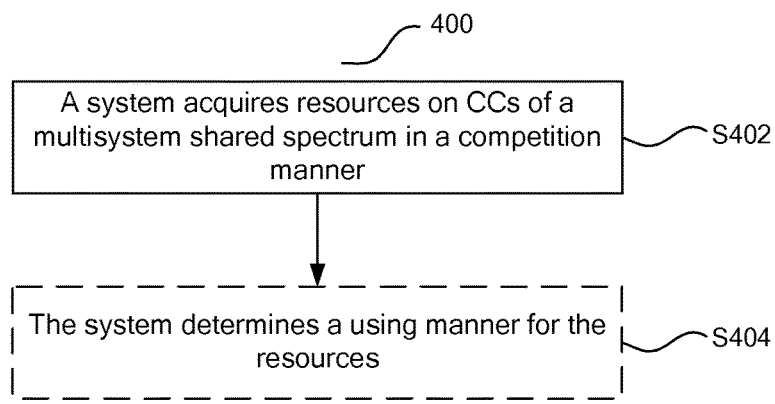
FIG. 4 is a flowchart of a method 400 for acquiring radio resources according to an embodiment of the present disclosure.

FIG. 4 is a flowchart of a method 400 for acquiring radio resources according to an embodiment of the present disclosure. As shown in FIG. 4, the method mainly includes Step S402. In Step S402, a system acquires resources from CCs of a multisystem shared spectrum in a competition manner.

In the embodiment of the present disclosure, different systems acquire resources in the competition manner, thereby avoiding the condition that systems with strong interference simultaneously use the spectrum resources.

After Step S402 is executed, the method 400 may further include that: the system allocates the resources acquired in the competition manner to UE in a scheduling manner for data receiving or data sending; or, in the embodiment of the present disclosure, different eNBs or BSs and UE may also be considered as ordinary nodes, and each node acquires resources on the spectrum in a D2D competition manner. Therefore, the method may optionally further include that: the UE acquires resources on the multisystem shared spectrum according to system scheduling information, or, the UE acquires resources on the multisystem shared spectrum in a competition manner.

Optionally, in Step S402, the resources may be acquired in the competition manner in one of the following manners that:

Manner a: resources on each CC are acquired in the competition manner according to competition signals or channels on each CC;

Manner b: if the CCs corresponding to the multisystem shared spectrum are divided into at least two types, one type being carriers configured to transmit the competition signals or channels and the other type being CCs for data transmission acquired in the competition manner, the system acquires the competition signals or channels from the carriers configured to transmit the competition signals or channels, and then competes for resources on the CCs for data transmission through the acquired competition signals or channels; and Manner c: if the CCs corresponding to the multisystem shared spectrum are divided into at least two types, one type being CCs acquired in the competition manner and the other type being CCs acquired in a non-competition manner, the system determines corresponding CC acquisition manners according to types of the CCs.

Manner a may implement independent management over each CC, manner b may centralize resources occupied by the competition signals or channels and improve resource utilization efficiency, and manner c may implement combination of the competition manner and the scheduling manner to achieve advantages of the two and improve resource efficiency.

Optionally, the resources acquired in the competition manner include: resources for sending the competition signals or channels.

Optionally, the resources acquired in the competition manner may further include: resources configured for competition conflict resolving or resources configured for competition resource confirmation.

Optionally, the step that the system acquires the resources from the CCs on the multisystem shared spectrum in the competition manner includes that:

the system sends signals monitored on the resources for sending the competition signals or channels by the system on competition confirmation resources corresponding to the selected resources for sending the competition signals or channels; and the system confirms whether the system has acquired the corresponding resources in the competition manner or not through signals, which are monitored and sent by other systems, received on the competition confirmation resources, wherein a data sending format on the competition confirmation resources is fixed or corresponds to the competition signals. For example, if the other systems only monitor the signals or channels of the system on the competition signals or channels selected by the system, it is indicated that competition succeeds. If the other systems also monitor signals or channels of the other systems, the system may give up the resources acquired in the competition manner last time according to monitoring conditions, and performs competition again, or may still use the resources acquired in the competition manner to send subsequent data. In an exemplary embodiment, the system may determine monitoring conditions of the other systems according to information sent by the other systems on the competition confirmation resources.

After the resources are acquired in the competition manner, in Step S404, the system may also determine a using manner for the resources. Optionally, when the resources acquired in the competition manner are discontinuous time-domain resources, the using manner, determined by the system, for the resources may include at least one of:

an eNB or a BS broadcasts time-domain position information of the discontinuous time-domain resources;

the eNB or BS virtualizes the discontinuous physical resources into continuous resources, and uses the resources according to a working manner adopted by the system for continuous resources;

the eNB or BS uses the resources in a time division duplex manner, and configures resources which the system fails to acquire through the competition manner into uplink subframes; and the eNB or BS uses the resources according to the working manner adopted by the system for continuous resources, and defines the resources which the system fails to acquire through the competition manner into zero-power (muting) subframes or blank subframes.

Optionally, in the embodiment of the present disclosure, timing of an HARQ of a physical shared channel may be redefined according to the resources acquired in the competition manner so that there are resources available for the eNB or BS or a terminal during data sending, or an adaptive manner or a suspending waiting manner may also be adopted for processing according to known timing, that is: when a resource is unavailable, the eNB or BS or the terminal waits for the next available resource for sending, and a corresponding receiving party also does not receive any data when a current resource is unavailable, and waits for the next available resource for receiving.

In the competition manner, systems with strong interference may be prevented from simultaneously using the spectrum resources.

According to the embodiment of the present disclosure, a device 500 for acquiring radio resources is provided. The device 500 for acquiring radio resources may be configured to implement the abovementioned method 400 for acquiring radio resources.

Figure 5:
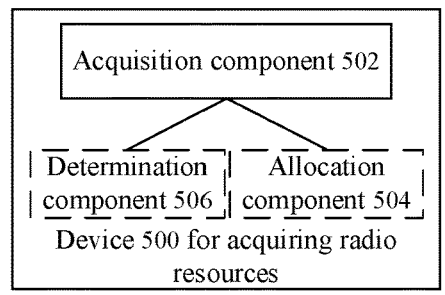
FIG. 5 is a structure diagram of a device 500 for acquiring radio resources according to an embodiment of the present disclosure.

FIG. 5 is a structure diagram of a device 500 for acquiring radio resources according to an embodiment of the present disclosure. As shown in FIG. 5, the device mainly includes: an acquisition component 502, configured to acquire resources from CCs on a multisystem shared spectrum in a competition manner.

Optionally, as shown in FIG. 5, the device 500 may further include: an allocation component 504, configured to allocate the resources acquired in the competition manner to UE in a scheduling manner.

Optionally, the acquisition component 502 may acquire the resources from the CCs on the multisystem shared spectrum in one of the following manners that:

a system competes for resources on each CC according to competition signals or channels on each CC;

if the CCs corresponding to the multisystem shared spectrum are divided into at least two types, one type being carriers configured to transmit the competition signals or channels and the other type being CCs for data transmission acquired in the competition manner, the competition signals or channels are acquired from the carriers configured to transmit the competition signals or channels, and then resources on the CCs for data transmission are acquired in the competition manner through the acquired competition signals or channels; and if the CCs corresponding to the multisystem shared spectrum are divided into at least two types, one type being CCs acquired in the competition manner and the other type being CCs acquired in a non-competition manner, corresponding CC acquisition manners are determined according to types of the CCs.

Optionally, the resources acquired in the competition manner include: resources for sending the competition signals or channels.

Optionally, the resources acquired in the competition manner may further include: resources configured for competition conflict resolving or resources configured for competition resource confirmation.

The acquisition component 502 may include:

a sending component, configured to send signals monitored on the resources for sending the competition signals or channels by the system on competition confirmation resources corresponding to the selected resources for sending the competition signals or channels; and a confirmation component, configured to confirm whether the system has acquired the corresponding resources in the competition manner or not through signals, which are monitored and sent by other systems, received on the competition confirmation resources, wherein a data sending format on the competition confirmation resources is fixed or corresponds to the competition signals.

Optionally, as shown in FIG. 5, the device 500 may further include: a determination component 506, configured to determine a using manner for the resources according to the resources acquired by the acquisition component 502.

Optionally, if the resources acquired in the competition manner are discontinuous time-domain resources, the using manner, determined by the determination component 506, for the resources includes at least one of the following manners that:

an eNB or a BS broadcasts time-domain position information of the discontinuous time-domain resources;

the eNB or BS virtualizes the discontinuous physical resources into continuous resources, and uses the resources according to a working manner adopted by the system for continuous resources;

the eNB or BS uses the resources in a time division duplex manner, and configures resources which the system fails to acquire through the competition manner into uplink subframes; and the eNB or BS uses the resources according to the working manner adopted by the system for continuous resources, and defines the resources which the system fails to acquire through the competition manner into zero-power subframes or blank subframes.

Optionally, the device may further include: an HARQ timing processing component, configured to redefine timing of an HARQ of a physical shared channel according to the resources acquired in the competition manner so that there are resources available for the eNB or BS or a terminal during data sending, or adopt an adaptive manner or a suspending waiting manner for processing according to known timing.

The device for acquiring radio resources of the embodiment of the present disclosure has implementation modes corresponding to all optional implementation modes in the abovementioned method for acquiring radio resources, which will not be specifically elaborated.

In order to further describe the technical solutions provided by the embodiment of the present disclosure, descriptions will be given below with an LTE system as an example.

When an LTE system is applied to a spectrum shared by multiple systems, main problems are interference between LTE systems of different operating companies and interference between different systems such as an LTE system and a WiFi system.

Embodiment 1

In the embodiment, an LTE system is applied to an unlicensed spectrum or a licensed spectrum.

According to a method for acquiring resources for the LTE system in the embodiment, resources are acquired by taking a carrier as a unit, and by a method of combining interference measurement and aggregation (releasing) of carriers, the problem of intersystem interference is solved, and spectrum utilization efficiency is improved.

In the embodiment, the method for acquiring resources specifically includes that: a maximum carrier number of a system is determined according to measured values, specifically including that:

if the measured values are smaller than a carrier number threshold H and the number of currently used carriers is smaller than H, the number of the used carriers may be selected on a premise that a first predefined principle is met, wherein the first predefined principle specifically includes that: the maximum carrier number of the system is required not to exceed H; if H is 0 or H is less than or equal to a predefined value N, the maximum carrier number of the system is N or k, N and k are positive integers and k is smaller than N; and a value of N is preferably 1 or 2 or 3. If the number of the carriers currently used by the system is more than H, it is necessary to release occupied radio resources.

In the embodiment, the system performs above measurement once within a certain time, wherein measurement time is independently selected by each system within a certain range, and measurement may also be performance according to a certain period, or, triggered measurement is adopted according to system performance, reference performance including at least one of: a Channel Quality Indicator (CQI) reported by a terminal, a data retransmission probability, interference measured through an uplink signal, Reference Signal Received Power (RSRP) or Reference Signal Received Quality (RSRQ), Relative Narrowband Transmission Power (RNTP), an interference condition measured by an eNB or a BS and the like.

In the embodiment, a range of the measurement time is limited to ensure that each system is certain to execute measurement, thereby avoiding the condition that the resources are occupied all the time.

In the embodiment, if the number of the carriers currently aggregated by the system is more than H, it is necessary to release the occupied radio resources.

In the embodiment, when the occupied radio resources are released, the radio resources may be released at one time to make the number of aggregated carriers after the release less than or equal to H; or, to release at least more than or equal to 1 carrier, under which circumstance the number of aggregated carriers after the release may be more than H.

If the radio resources are not released at one time, a measurement time interval is shortened until the number of the aggregated carriers is less than or equal to H.

In the embodiment, a value of H may be a predefined value, and may also change along with time or according to a transmission condition or a condition of the measured values.

In such a manner, the measurement time interval may be redefined after the number of the aggregated carriers meets a requirement.

In the embodiment, the measurement time interval may be shortened according to an equal proportion, the measurement time interval is, for example, shortened by ½ of the previous time interval until the transmission time interval is shortened to a minimum unit of the measurement time (such as 1 millisecond), or, the transmission time interval is reduced gradually according to a predefined value.

When the radio resources are released, the CCs with large measured values (for example: CCs with strong interference) may be preferably released, or, any CC may be selected to be released.

Optionally, if the number of the currently aggregated carriers is smaller than H, the number of the aggregated carriers may be further increased or decreased according to a requirement on a premise that the abovementioned limit is met.

In the embodiment, the measured values may be determined according to measured interference signal strength, or, the measured values are determined according to measured known signal strength, or, the measured values are determined according to a ratio of the measured known signal strength to interference signal strength. The measured values are measured by taking a CC as a unit.

Descriptions will be given below with examples.

Example 1

In the example, there are currently 4 available CCs (sub-channels/serving cells), the number of carriers of which the measured values are smaller than a threshold is currently 4, and then a system may freely select CCs to be used from the 4 CCs according to a practical application requirement.

Example 2

In the example, there are currently 5 available CCs (sub-channels/serving cells), the number of carriers of which the measured values are smaller than the threshold is currently 3, then the number of CCs currently used by the system is 1, and the system may freely select the CC to be used from the 3 CCs according to a practical application requirement.

Example 3

In the example, there are currently 3 available CCs (sub-channels/serving cells), the number of the carriers of which the measured values are smaller than the threshold is currently 0, then the number of the CCs currently used by the system is 3, and the system is required to release the used resources, may release 2 CCs, and may also release one CC and then release one CC if not meeting the requirement during next measurement.

In the embodiment, a limit of CA of the system may be adopted for the eNB or BS, and mainly refers to the number of CCs available for the eNB or BS; and for example: the eNB or BS determines the number of CCs configured for access of UE according to the measured values, and the eNB or BS only transmit downlink data and downlink signals on the available CCs.

If the eNB or BS may reduce interference and neglect interference of a public signal or a public channel by virtue of a multi-antenna (directional antenna, directional beam and the like) technology, the abovementioned limit may also be adopted for a terminal, and mainly refers to the number of CCs configured to UE by the eNB or BS according to the measured values measured by the UE.

In the embodiment, the method may further include that: the aggregated carriers are determined according to the measured values, specifically including that: CA is performed according to a sequence of small to large measured values, and if the system is able to use a resource of only one CC, the CC with the smallest measured value is selected, or, any CC is selected, or, the CC with the largest measured value is selected.

When resources on the aggregated carriers are used after CA, time-domain resources are continuous, so that an existing resource using manner may be applied, and a new resource using manner may also be introduced by future system evolution.

If magnitudes of the measured values represent interference degrees, if each carrier is under a strong interference condition, a newly started system or a started system is required to withdraw and reduce the number of used CCs, for example: only use one CC, thereby reducing own interference and reducing interference to other systems.

By the abovementioned method, interference between systems on the unlicensed spectrum may be reduced, the problem that a certain system always occupies and does not release resources may be solved at the same time, both a system started earlier and a system started later have the same right, and resource utilization fairness is ensured.

Embodiment 2

In the embodiment, an LTE system is applied to an unlicensed spectrum or a licensed spectrum.

According to a method for acquiring resources for the LTE system in the embodiment, the problem of interference between systems is solved in a resource competition manner, and spectrum utilization efficiency is improved.

The method specifically includes that: different systems acquire resources in a competition manner, and the systems allocate the resources acquired in the competition manner to UE in a scheduling manner for data receiving or data sending.

The step that the resources are acquired in the competition manner specifically includes that: resources on CCs are acquired according to competition signals or channels in the competition manner.

Notes: the competition manner may adopt a D2D competition manner, or, a competition manner in WiFi, wherein available resources represented by the competition signals or channels are required to be redefined.

In the embodiment, resources on a CC are divided into at least two parts, one part being competition related resources and the other part being resources corresponding to the competition signal or the competition channels and acquired for data transmission in the competition manner.

In the embodiment, the competition related resources include: resources for sending the competition signals or channels, and may further include: resources configured for competition conflict resolving or resources configured to competition resource confirmation.

In the embodiment, the system sends signals monitored on the competition resources by the system on confirmation resources corresponding to the selected competition signals or channels, and the system confirms whether the system has acquired the corresponding resources in the competition manner or not through signals, which are monitored and sent by other systems, received on the confirmation resources. For example, if the other systems only monitor the signals or channels of the system on the competition signals or channels selected by the system, it is indicated that competition succeeds. If the other systems also monitor signals or channels of the other systems, the system may give up the resources acquired in the competition manner last time according to monitoring conditions, and performs competition again, or may still use the resources acquired in the competition manner to send subsequent data (such a scenario is equivalent to a weak interference condition).

In the embodiment, a data sending format on the confirmation resources is fixed or corresponds to the competition signals.

In the embodiment, the system determines the monitoring conditions of the other systems according to information sent by the other systems on the confirmation resources. For example, signal indexes monitored by the other systems, or, other methods such as 0 or 1 is used to represent whether the number of the monitored signals is equal to 1 or not.

In the embodiment, the competition channels may bear system information.

Descriptions will be given below with specific examples.

Example 1

In the example, if there are k selectable competition resources, system A selects competition resource h1 to send a competition signal or channel, and monitors competition signals or channels of other systems on the other competition resources (a part or all), and if no competition signals or channels are monitored, it means that only the system works or the other systems use the same competition signal or channel with the system.

System A may send data on a data resource corresponding to competition resource h1; or, system A may select to send data (the data is sent on t1 sometimes, sent on t2 sometimes and sent on t3 sometimes) on data resources corresponding to multiple competition resources (such as: t1, t2 and t3) in the k competition resources; or, system A monitors signals or channels sent by the other systems in confirmation resources, and selects one confirmation resource from the confirmation resources to send its own corresponding signal or channel, system A may send data (including sending on a single competition resource or sending on multiple competition resources) on the data resource corresponding to competition resource h1 if system A does not monitor information of the other systems in the confirmation resource, and if the information of the other systems is monitored in the confirmation resource, system A selects a data resource corresponding to another competition resource h2 to send the data according to a predefined priority rule, or, still sends the data on the data resource corresponding to the competition resource h1; and in an exemplary embodiment, the priority rule may be determined according to indexes of the confirmation resources, or, may be determined according to the monitored information.

Example 2

In the example, if there are k selectable competition resources, system A selects competition resource h1 to send the competition signal or channel, and monitors the competition signals or channels of the other systems on the other competition resources (a part or all), and if the competition signals or channels of the other systems are monitored, it means that the system works.

System A monitors the signals or channels sent by the other systems in the confirmation resources, and selects a confirmation resource corresponding to competition resource h1 to send its own corresponding signal or channel from the confirmation resources, and if system A does not monitor any information of the other systems in the confirmation resources, system A sends the data on the data resource corresponding to competition resource h1.

If system A monitors the information of the other systems in the confirmation resources, system A judges whether the other systems conflict with system A on competition resource h1 or not according to the information of the other systems, and if YES, system A judges whether to send the data on the data resource corresponding to competition resource h1 or give up the resource and compete for the resource again according to the information, monitored in the confirmation resources, of the other systems.

Notes: if information of multiple systems is monitored on the confirmation resources and the information of each system is inconsistent, the system information with the highest priority may be selected for determination according to predefined priorities.

In the embodiment, the data transmission resources may be divided into resource groups by taking a timeslot/subframe/radio frame and/or a resource block/resource block group as a unit, and a competition signal or channel corresponds to a resource group.

Systems of different operating companies or different modes determine own available resources through the competition signals or channels, transmit data to UE on these resources, and schedule the UE to transmit data to an eNB or a BS on the corresponding resources.

In the embodiment, if the resources acquired in the competition manner are discontinuous time-domain resources, a resource using manner may specifically include at least one of the following manners that:

the eNB or BS broadcasts time-domain position information of the discontinuous time-domain resources;

the eNB or BS virtualizes the discontinuous physical resources into continuous resources, and uses the resources according to a working manner adopted by the system for continuous resources;

the UE determines the time-domain position information of the discontinuous resources according to the information broadcast by the eNB or BS, and then determines positions of the virtual continuous resources, and determines a manner for transmission on the corresponding physical resources according to transmission on the virtual continuous resources, transmission including sending and receiving;

the eNB or BS uses the resources in a time division duplex manner, and configures resources which the system fails to acquire through the competition manner into uplink subframes, wherein a transparent manner may be implemented for the UE as long as data sending is not scheduled on the resources which the system fails to acquire through the competition manner; and the eNB or BS uses the resources according to the working manner adopted by the system for continuous resources, and defines the resources which the system fails to acquire through the competition manner into zero-power (muting) subframes for the UE to perform classification measurement, for example: measurement over the resources which the system fails to acquire through the competition manner and measurement over the resources acquired in the competition manner, and moreover, the UE may perform data transmission and receiving according to the available resources and new HARQ timing.

In the embodiment, timing of an HARQ of a physical shared channel may be redefined according to the resources acquired in the competition manner in a manner that there are resources available for the eNB or BS or the terminal during data sending, and an adaptive manner or a suspending waiting manner may also be adopted for processing according to known timing, that is: when a resource is unavailable, the eNB or BS or the terminal waits for the next available resource for sending, and a corresponding receiving party also does not receive any data when a current resource is unavailable, and waits for the next available resource for receiving.

In the competition manner, systems with strong interference may be prevented from simultaneously using the spectrum resource.

Embodiment 3

In the embodiment, an LTE system is applied to an unlicensed spectrum or a licensed spectrum.

According to a method for acquiring resources in the embodiment, the problem of interference between systems is solved in a resource competition manner, and spectrum utilization efficiency is improved.

The method for acquiring resources in the embodiment includes that: eNBs or BSs and terminals of different systems are considered as ordinary nodes, and resources are acquired on the spectrum in a D2D competition manner.

In the embodiment, each node competes for resources on a CC where it is located according to competition signals or channels.

The eNBs or BSs may send signals and system information on the resources acquired in the competition manner for access of UE, and the UE may autonomously detect the signals and system information sent by the eNBs or BSs on one or more CCs, may autonomously select an eNB or a BS to access, and may also select multiple eNBs or BSs to access for data transmission, wherein the UE also obtains the resources in the competition manner to send data to the eNB or BS.

In the competition manner, systems with strong interference may be prevented from simultaneously using the spectrum resource.

Embodiment 4

In the embodiment, an LTE system is applied to an unlicensed spectrum, and according to a method for acquiring resources for the system, the problem of interference between systems is solved in a resource competition manner, and spectrum utilization efficiency is improved.

In the embodiment, eNBs or BSs and terminals of different systems are considered as ordinary nodes, and resources are acquired on the spectrum in a D2D competition manner.

In the embodiment, CCs are divided into at least two types, one type being carriers configured to transmit competition signals or channels and the other type being CCs for data transmission acquired in the competition manner.

In the embodiment, resources on a part of CCs are used in a scheduling manner, and for example, resources on the unlicensed spectrum are scheduled for data transmission through a licensed spectrum; or, resources on a part of CCs are determined to be using objects according to competition channels or channels on the other CCs, and for example, resources, acquired in the competition manner, corresponding to the competition signals or channels are not only resources of the corresponding CCs, but also include resources of the other CCs.

In the competition manner of the embodiment, systems with strong interference may be prevented from simultaneously using the spectrum resource.

Embodiment 5

In the embodiment, an LTE system is applied to an unlicensed spectrum or a licensed spectrum, and in the embodiment, the problem of interference between systems is solved in a resource competition manner, and spectrum utilization efficiency is improved.

In the embodiment, different systems acquire resources in a competition manner, and the systems allocate the resources acquired in the competition manner to UE in a scheduling manner for data receiving or data sending.

The systems compete for resources on CCs where they are located according to competition signals or channels when acquiring the resources in the competition manner.

In the embodiment, the CCs are divided into at least two types, one type being carriers configured to transmit the competition signals or channels and the other type being CCs for data transmission acquired in the competition manner. Each eNB or BS acquires available CCs through competition signals or channels on at least one CC.

Systems of different operating companies or different modes determine own available resources through the competition signals or channels, transmit data to UE on these resources, and schedule the UE to transmit data to an eNB or a BS on the corresponding resources.

In the competition manner of the embodiment, systems with strong interference may be prevented from simultaneously using the spectrum resource.

Embodiment 6

In the embodiment, the abovementioned method for determining radio resources 100 and method for acquiring radio resources 400 are combined.

In the embodiment, a system select aggregated carriers according to measured values, and then acquires resources on the selected aggregated carriers in a competition manner.

In the embodiment, an eNB or a BS determines the maximum number of carriers which may be aggregated according to the measured values, then determines the number of carriers required to be aggregated according to a requirement, selects CCs on which resources are to be acquired in the competition manner according to the measured values, competes for the resources with other eNBs or BSs or UE on the CCs, and transmits data on the acquired resources.

Embodiment 7

In the embodiment, an LTE system is applied to an unlicensed spectrum.

The embodiment describes a system bandwidth management manner provided by the embodiment of the present disclosure.

In the embodiment, a bandwidth of the system and a frequency point of a system are predefined, and are not allowed to be freely changed, wherein the bandwidth of the system may be defined in the following two manners:

Manner 1: the number of CCs is considered when the premise that a bandwidth of the system corresponding to the CCs is increased as much as possible is met.

In the implementation mode, the bandwidth of the system is a predefined value, and may be 20 MHz, that is: all systems are defined according to 20 MHz in a unified manner, so that each system has the same central frequency point when systems of different operating companies work on the same spectrum, and orthogonality of corresponding sequences, such as: a synchronization signal sequence and a reference signal sequence, and frequency-domain interference coordination are ensured.

Since an available spectrum may have multiple conditions, sizes of available spectrums of different frequency bands are different and sizes of available resources may not be integral times 20 MHz in some scenarios in consideration that guard intervals are required to be reserved between CCs, definition of a bandwidth of the system of smaller than 20 MHz may also be taken into consideration according to a size of remaining resources.

Or, another manner may also be adopted, that is, an interference randomization manner is adopted for processing without considering orthogonality of sequences of different systems. When such a manner is adopted, the system is only required to meet a specific access requirement, for example, that the central frequency point is a multiple of 300 kHz, and the bandwidth of the system and a position of the central frequency point of the system are independently selected in combination with a current size of available resources according to detected bandwidths of other systems or system bandwidths of neighboring cells.

Manner 2: the bandwidth of the system corresponding to the CCs is increased as much as possible after a certain requirement on the number of the CCs is met.

In order to obtain more CCs to facilitate interference control, CCs may be defined as many as possible according to an available spectrum size, the bandwidth of the system and the number of the CCs are balanced, and the bandwidth of the system corresponding to the CCs is increased as much as possible after the certain requirement on the number of the CCs is met.

For example, the bandwidth of the system is increased on the premise of ensuring at least two CCs, and for example, 20 MHz is defined into 2 10 MHz CCs, 40 MHz is defined into 2 20 MHz CCs and 100 MHz is defined into 5 20 MHz CCs; and for example, the bandwidth of the system is increased on the premise of ensuring at least three CCs, and for example, 20 MHz is defined into 4 5 MHz CCs, 40 MHz is defined into 5 8 MHz CCs and 100 MHz is defined into 5 20 MHz CCs.

From the above, it can be seen that the technical solutions provided by the embodiment of the present disclosure adopt specific management manners for different types of resources, so that radio resource utilization efficiency and transmission performance of a wireless system may be improved, and interference between different systems may be reduced.

Obviously, those skilled in the art should know that each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

What is claimed is:

1. A method for determining radio resources, comprising:
   acquiring predefined information, wherein the predefined information comprises indication information of a dedicated node, and/or, measured values of Component Carriers (CCs) on a multisystem shared spectrum, wherein the indication information comprises: information of the maximum number of CCs, which are available to a system, on the multisystem shared spectrum, and the measured values are acquired according to preset signals on the CCs; and
   determining, according to the predefined information, the maximum number of CCs, which are available to the system, on the multisystem shared spectrum;
   when the predefined information comprises the measured values of the CCs on the multisystem shared spectrum, if the number of CCs of which the measured values are smaller than a threshold is H and the number of CCs currently used by the system is more than H, the method further comprises: releasing, by the system, occupied radio resources;
   wherein releasing, by the system, the occupied radio resources comprises: releasing, by the system, a part of the occupied radio resources at one time to make the number of aggregated CCs after the release less than or equal to H, or, to make the number of released CCs at least more than or equal to 1.

2. The method as claimed in claim 1, wherein,
   when the predefined information comprises the measured values of the CCs on the multisystem shared spectrum, determining the maximum number of CCs, which are available to the system, on the multisystem shared spectrum according to the predefined information comprises: if the number of CCs of which the measured values are smaller than a threshold is H and the number of CCs currently used by the system is smaller than H, selecting the number of the CCs used by the system on a premise that a first predefined principle is met, wherein the first predefined principle comprises that: the maximum number of the CCs used by the system is required not to exceed H.

3. The method as claimed in claim 2, wherein, if H is 0 or H is less than or equal to a predefined value N, the maximum number of the CCs used by the system is N or k, wherein N and k are positive integers and k is smaller than N.

4. The method as claimed in claim 1, wherein, when the predefined information comprises the measured values of the CCs on the multisystem shared spectrum, acquiring the predefined information comprises one of:
   determining the measured values of the corresponding CCs according to interference signal strength measured on each CC;
   determining the measured values of the corresponding CCs according to known signal strength measured on each CC; and
   determining the measured values of the corresponding CCs according to a ratio of known signal strength to interference signal strength measured on each CC.

5. The method as claimed in claim 1, when the predefined information comprises the measured values of the CCs on the multisystem shared spectrum, after determining the maximum number of CCs, which are available to the system, on the multisystem shared spectrum according to the predefined information, the method further comprising: determining the CCs used by the system according to the measured values of various CCs.

6. The method as claimed in claim 5, wherein determining the CCs used by the system according to the measured values of various CCs comprises:
   performing Carrier Aggregation (CA) according to a sequence of small to large measured values, and if the system is able to use a resource of only one CC, selecting the CC with the smallest measured value, or, selecting any CC, or, selecting the CC with the largest measured value.

7. The method as claimed in claim 1, after determining the maximum number of CCs, which are available to the system, on the multisystem shared spectrum according to the predefined information, the method further comprising:
   acquiring, by the system, resources in a competition manner from CCs, the number of which is not larger than the maximum number of CCs on the multisystem shared spectrum.

8. The method as claimed in claim 7, after acquiring, by the system, the resources in the competition manner from the CCs, the number of which is not larger than the maximum number of the CCs on the multisystem shared spectrum, the method further comprising:

allocating, by the system, the resources acquired in the competition manner to User Equipment (UE) in a scheduling manner.

9. The method as claimed in claim 7, further comprising:
acquiring, by the UE, resources on the multisystem shared spectrum according to system scheduling information, or, acquiring, by the UE, resources on the multisystem shared spectrum in a competition manner.

10. The method as claimed in claim 7, wherein acquiring, by the system, the resources in the competition manner from the CCs, the number of which is not larger than the maximum number of the CCs on the multisystem shared spectrum comprises one of:
competing for, by the system, the resources on each CC according to competition signals or channels on each CC, wherein the number of the CCs acquired by the system in the competition manner is not larger than the maximum number of the CCs;
if the CCs corresponding to the multisystem shared spectrum are divided into at least two types, one type being carriers configured to transmit the competition signals or channels and the other type being CCs for data transmission acquired in the competition manner, acquiring, by the system, the competition signals or channels from the carriers configured to transmit the competition signals or channels, and then competing for resources on the CCs for data transmission through the acquired competition signals or channels, wherein the sum of the number of the acquired CCs configured to transmit the competition signals or channels and the number of the CCs for data transmission is not larger than the maximum number of the CCs; and
if the CCs corresponding to the multisystem shared spectrum are divided into at least two types, one type being CCs acquired in the competition manner and the other type being CCs acquired in a non-competition manner, determining, by the system, corresponding CC acquisition manners according to types of the CCs, wherein the sum of the number of the CCs acquired by the system in the competition manner and the number of the CCs acquired in the non-competition manner is not larger than the maximum number of the CCs.

11. The method as claimed in claim 9, after acquiring, by the system, the resources in the competition manner from the CCs, the number of which is not larger than the maximum number of the CCs on the multisystem shared spectrum, the method further comprising:
determining, by the system, a using manner for the resources according to the acquired resources.

12. The method as claimed in claim 11, wherein determining, by the system, the using manner for the resources according to the acquired resources comprises:
if the resources acquired in the competition manner are discontinuous time-domain resources, determining the using manner for the resources to comprise at least one of:
virtualizing, by an Evolved Node B (eNB) or a Base Station (BS), the discontinuous physical resources into continuous resources, and using the resources according to a working manner adopted by the system for continuous resources;
using, by the eNB or BS, the resources in a time division duplex manner, and configuring resources which the system fails to acquire through the competition manner into uplink subframes;
using, by the eNB or BS, the resources according to the working manner adopted by the system for continuous resources, and defining the resources which the system fails to acquire through the competition manner into zero-power subframes or blank subframes; and
broadcasting, by the eNB or BS, time-domain position information of the discontinuous time-domain resources.

13. The method as claimed in claim 12, further comprising: redefining timing of a Hybrid Automatic Repeat Request (HARQ) of a physical shared channel according to the resources acquired in the competition manner so that there are resources available for the eNB or BS or a terminal during data sending, or, adopting an adaptive manner or suspending waiting manner for processing according to known timing.

14. The method as claimed in claim 1, further comprising:
setting a bandwidth of the system and a frequency point of the system, wherein frequency points of different systems on the same spectrum are aligned.

15. The method as claimed in claim 14, wherein setting the bandwidth of the system and the frequency point of the system comprises: setting the bandwidth of the system corresponding to the CCs on the premise of ensuring the number of the CCs used by the system; or, setting the bandwidth of the system corresponding to the CCs before the number of the CCs used by the system is determined.

16. The method as claimed in claim 15, wherein setting the bandwidth of the system comprises: setting the bandwidth of the system to be a preset value, wherein the preset value comprises: 20 MHz, 10 MHz or 5 MHz; or, determining the preset value according to an available spectrum size of a frequency band on which the system works; or, setting the bandwidth of the system in a manner that the available spectrum size is able to define the number of CCs as many as possible.

17. A device for determining radio resources, the device comprises a hardware processor and a memory, wherein the hardware processor is configured to execute the components stored in the memory, and the components comprising:
an acquisition component, configured to acquire predefined information, wherein the predefined information comprises indication information of a dedicated node, and/or, measured values of Component Carriers (CCs) on a multisystem shared spectrum, wherein the indication information comprises: information of the maximum number of CCs, which are available to a system, on the multisystem shared spectrum, and the measured values are acquired according to preset signals on the CCs; and
a first determination component, configured to determine, according to the predefined information, the maximum number of CCs, which are available to the system, on the multisystem shared spectrum;
a releasing component, configured to, when the predefined information comprises the measured values of the CCs on the multisystem shared spectrum, if the number of CCs of which the measured values are smaller than a threshold is H and the number of CCs currently used by the system is more than H, release occupied radio resources;
wherein the releasing component is further configured to release a part of the occupied radio resources at one time to make the number of aggregated CCs after the release less than or equal to H, or, to make the number of released CCs at least more than or equal to 1.

18. The device as claimed in claim 17, the components further comprising a second determination component, configured to, when the predefined information comprises the measured values of the CCs on the multisystem shared spectrum, determine the CCs used by the system according to the measured values of various CCs.

19. The device as claimed in claim 17, the components further comprising:
a competition component, configured to acquire resources in a competition manner from CCs, the number of which is not larger than the maximum number of CCs on the multisystem shared spectrum.

20. A method for acquiring radio resources, comprising:
acquiring, by a system, resources from Component Carriers (CCs) on a multisystem shared spectrum in a competition manner;
determining, by the system, a using manner for the resources according to the acquired resources;
wherein determining, by the system, the using manner for the resources according to the acquired resources comprises:
if the resources acquired in the competition manner are discontinuous time-domain resources, determining the using manner for the resources to comprise at least one of:
broadcasting, by an Evolved Node B (eNB) or a Base Station (BS), time-domain position information of the discontinuous time-domain resources;
virtualizing, by the eNB or BS, the discontinuous physical resources into continuous resources, and using the resources according to a working manner adopted by the system for continuous resources;
using, by the eNB or BS, the resources in a time division duplex manner, and configuring resources which the system fails to acquire through the competition manner into uplink subframes; and
using, by the eNB or BS, the resources according to the working manner adopted by the system for continuous resources, and defining the resources which the system fails to acquire through the competition manner into zero-power subframes or blank subframes.

21. The method as claimed in claim 20, wherein acquiring, by the system, the resources from the CCs on the multisystem shared spectrum in the competition manner comprises one of:
competing for, by the system, the resources on each CC according to competition signals or channels on each CC;
if the CCs corresponding to the multisystem shared spectrum are divided into at least two types, one type being carriers configured to transmit the competition signals or channels and the other type being CCs for data transmission acquired in the competition manner, acquiring, by the system, the competition signals or channels from the carriers configured to transmit the competition signals or channels, and then competing for resources on the CCs for data transmission through the acquired competition signals or channels; and
if the CCs corresponding to the multisystem shared spectrum are divided into at least two types, one type being CCs acquired in the competition manner and the other type being CCs acquired in a non-competition manner, determining, by the system, corresponding CC acquisition manners according to types of the CCs.

22. The method as claimed in claim 20, wherein the resources acquired in the competition manner comprise: resources for sending the competition signals or channels, and the resources acquired in the competition manner further comprise: resources configured for competition conflict resolving or resources configured for competition resource confirmation.

23. The method as claimed in claim 22, wherein acquiring, by the system, the resources from the CCs on the multisystem shared spectrum in the competition manner comprises:
sending, by the system, signals monitored on the resources for sending the competition signals or channels by the system on competition confirmation resources corresponding to the selected resources for sending the competition signals or channels; and
confirming, by the system, whether the system has acquired the corresponding resources in the competition manner or not through signals, which are monitored and sent by other systems, received on the competition confirmation resources.

24. The method as claimed in claim 20, further comprising: redefining timing of a Hybrid Automatic Repeat Request (HARQ) of a physical shared channel according to the resources acquired in the competition manner so that there are resources available for the eNB or BS or a terminal during data sending, or adopting an adaptive manner or suspending waiting manner for processing according to known timing.

* * * * *